United States Patent
Swift et al.

(10) Patent No.: US 7,333,655 B1
(45) Date of Patent: **\*Feb. 19, 2008**

(54) EVALUATING GRAPHIC IMAGE FILES FOR OBJECTIONABLE CONTENT

(76) Inventors: Dana B. Swift, 1918 E. 36TH St., Tulsa, OK (US) 74105; Glenn A. Chalker, 3421 E. 87TH Pl., Tulsa, OK (US) 74137

( * ) Notice: Subject to any disclaimer, the term of this patent is extended or adjusted under 35 U.S.C. 154(b) by 255 days.

This patent is subject to a terminal disclaimer.

(21) Appl. No.: 11/332,952

(22) Filed: Jan. 17, 2006
(Under 37 CFR 1.47)

Related U.S. Application Data (62) Division of application No. 11/121,258, filed on May 3, 2005, now Pat. No. 7,027,645, which is a division of application No. 09/865,891, filed on May 25, 2001, now Pat. No. 6,895,111.

(60) Provisional application No. 60/207,593, filed on May 26, 2000.

(51) Int. Cl.
*G06K 9/00* (2006.01)
(52) U.S. Cl. ..................................... 382/165
(58) Field of Classification Search ........ 382/162–167, 382/103, 118, 115; 358/518–504; 345/589–604
See application file for complete search history.

(56) References Cited

U.S. PATENT DOCUMENTS

| | | | | |
|---|---|---|---|---|
| 5,793,884 A | * | 8/1998 | Farrell | 382/167 |
| 6,697,502 B2 | * | 2/2004 | Luo | 382/115 |
| 6,751,348 B2 | * | 6/2004 | Buzuloiu et al. | 382/165 |

OTHER PUBLICATIONS

Forsyth et al., Identifying nude pictures, Proc. IEEE 0-1886-7620.*
Jones et al., Statistical color models with application to skin detection, IEEE 0-7695-0149-4/99, 1999.*

* cited by examiner

*Primary Examiner*—Ishrat Sherali
(74) *Attorney, Agent, or Firm*—George S. Gray (57) ABSTRACT

Computer based method and apparatus for evaluating a graphic image file for the presence of objectionable visual content. The graphic image file comprises a number of pixels each having spectral components defined in accordance with a color model (such as RGB). Relative weighting of the spectral components of each pixel is performed to classify each pixel as either not representing human skin or as possibly representing human skin. For those sets of adjacent pixels that possibly represent human skin, a brightness test is performed to determine whether the set of pixels represents a curved surface. A statistical analysis evaluates the run length of each such set of pixels. Display of the graphic image file is allowed or disallowed based on the results of the foregoing analyses. Web pages available from the World Wide Web are further screened for objectionable terms in the associated URLs and text.

3 Claims, 5 Drawing Sheets

EVALUATING GRAPHIC IMAGE FILES FOR OBJECTIONABLE CONTENT

RELATED APPLICATIONS

This divisional application claims priority to U.S. Provisional Application No. 60/207,593 filed May 26, 2000, parent U.S. patent application Ser. No. 09/865,891, filed May 25, 2001 (issued as U.S. Pat. No. 6,895,111, on May 17, 2005), and previous U.S. divisional patent application Ser. No. 11/121,258, filed May 3, 2005, issued as U.S. Pat. No. 7,027,645 on Apr. 11, 2006 Dana B. Swift being the inventor for all three applications.

FIELD OF THE INVENTION

This invention relates generally to the field of personal computer and computer networks, and more particularly, but not by way of limitation, to a method and apparatus for evaluating graphic image files for objectionable content prior to display to prevent children from viewing such content.

BACKGROUND

Personal computers (PCs) and the Internet are among the greatest technological achievements of the twentieth century and have arguably transformed society more, in a shorter period of time, than any other technological area.

As will be recognized, a PC is a desk top or portable device that enables a user to execute programming in the form of software applications to manipulate digital data files. A typical PC includes a central processing unit (CPU), memory, display monitor, user input devices (such as a keyboard and mouse), and other peripheral devices as desired, such as a printer, image scanner, and modem.

The Internet is a global network of computer networks which facilitates the efficient transfer of data between computers all across the world. Within the Internet is a particular "network" of linked documents referred to as the World Wide Web. These documents are typically written in Hyperlink Text Markup Language (HTML) and are accessible using a network protocol referred to as the Hypertext Transfer Protocol (HTTP).

By connecting a PC to the Internet, a user can use browser software on the PC to quickly download and view publicly available HTML documents from all over the world. Such documents are referred to as "web pages" or "web sites" and are each assigned a unique Universal Resource Locator (URL), or domain name address, that enables the network to identify the desired page.

Internet standards relating to URL protocols are available on the Internet (see e.g., Cern RFC 1738). An example URL is http://www.heartsoft.com. As will be recognized, "http://" identifies the page as using hypertext protocol, "www" denotes location of the page on the world wide web, "com" is a top level domain name indicating the page is operated as a commercial site, and "heartsoft" is a second level domain name registered for use by the owner of the page. Subpages can branch from the initial page such as http://www.heartsoft.com/products.html. The term "products.html" is a subpage file name for an HTML document that might display information regarding various products available from the site.

Web pages typically incorporate textual information as well as graphic image files. Two of the more common formats for Internet-transferable graphic image files are Joint Photographic Experts Group (JPEG) and Graphics Interchange Format (GIF). Image files can also be accessed on the Internet through other protocols, such as File Transfer Protocol (FTP). An FTP site typically comprises a directory of image files that are listed by name and can be individually selected and downloaded on the local PC.

A user typically gains access to the Internet by subscribing to an Internet Service Provider (ISP). This enables the user to connect to the ISP (such as through a telephone line or coaxial cable line) and thereafter obtain access to the World Wide Web, as well as to send and receive electronic mail.

While the Internet has revolutionized the way in which business, education, personal finance and recreational activities are performed, the free-flow of information presents significant societal challenges as well, since a significant number of web pages on the Internet contain adult-oriented, sexually-explicit and/or otherwise pornographic text and images. Such materials are wholly unsuitable for minors, especially for young children. Indeed, it is illegal in most jurisdictions to intentionally or negligently provide such materials to minors.

The accessibility of such materials from the Internet provides significant concerns to parents and guardians who have Internet-accessible PCs at home, as well as to educators who have Internet-accessible PCs in school classrooms, laboratories and libraries. Public libraries across the country with Internet-accessible PCs are struggling with ways to restrict inappropriate content to minors while at the same time allowing adults to freely access such materials, if they so choose. Even businesses are concerned about restricting adult employees from such objectionable content due to productivity and sexual harassment concerns.

Several different approaches have been implemented in an attempt to prevent minors from accessing such objectionable content, but with only modest levels of success. Commercial pornographic sites are often password protected and require separate verification of user age before allowing full access to the site. Problems with this approach include the fact that not all commercial pornographic sites employ such an system, as well as the fact that objectionable material is sometimes made freely viewable at the opening (home) pages of such sites in order to entice adult users to subscribe to the site.

Moreover, there are many "free" private sites maintained by individuals that display objectionable content with little more than a disclaimer on the opening page that states that adult material is located on ensuing pages. These private sites often include advertising banners from commercial pornographic sites and advertising revenues are paid to the individuals based on the number of requests for the pages (or "hits"). Thus, there are economic incentives for such individuals to "disguise" their sites in order to entice unsuspecting users into selecting their sites, even if the users immediately exit once the content of the sites comes into view.

Another approach to limiting access to objectionable material involves the use of filtering techniques to examine the text of a web page (and/or the text of the associated URL for the web page) for objectionable terms that would tend to increase the probability that objectionable material is located on the site. This filtering can be provided in the form of software on the local PC and incorporated as a feature of the browser software or as a separate software application that runs in conjunction with the browser software. Filtering can also occur at the ISP level. Adults responsible for minor children (such as parents or guardians for home based PCs and system administrators for school-based PCs) can establish password enabled accounts for these children and the ISP will attempt to block the transfer of objectionable content to these accounts. While operable, such text-based filtering will not operate to prevent the downloading of objectionable graphic image files.

There is therefore a continued need for improvements to protect minors, especially young children, from exposure from objectionable, adult-oriented graphic image files. It is to such improvements that the present invention is directed.

SUMMARY OF THE INVENTION

The present invention is directed to a computer based method and apparatus for evaluating a graphic image file for the presence of objectionable visual content, the graphic image file comprising a number of pixels arranged into rows and columns, with each pixel having spectral components defined in accordance with a predefined color model.

In accordance with preferred embodiments, a computer system is provided with associated programming to evaluate the spectral components of each pixel to classify each pixel as either not representing human skin or as possibly representing human skin. Images with no pixels classified as possibly representing human skin are allowed to be displayed, and images with at least some pixels that are classified as possibly representing human skin are further subjected to a brightness analysis, which examines each set of adjacent pixels for curvature characteristics, and a statistical analysis which examines the run length of each set of adjacent pixels.

Preferably, the spectral components of each pixel are expressed as a set of numbers, with each number having an associated numeric value. For example, using an RGB color model the spectral components of each pixel are expressed as a set of red, green and blue (R, G, B) components corresponding to the respective amounts of red, green and blue in each pixel and having numeric values that range from values of m to n (such as 0-255).

A set of rules is generated to identify a selected pixel as not representing human skin in relation to the numeric values of the set of numbers, with the rules established to account for any number of variations in pigment and coloring of human skin. In a preferred embodiment, using the RGB color model each pixel is classified as not representing human skin when at least one of the following conditions is satisfied: the numeric value of the blue component is greater than the numeric value of the red component; the numeric value of the blue component is greater than the numeric value of the green component; the numeric value of the green component is greater than the numeric value of the red component; the numeric value of the green component is greater than the numeric value of the red component; the numeric value of the blue component is less than one-quarter the numeric value of the red component; and the numeric value of the blue component exceeds a threshold T.

In accordance with further preferred embodiments, the computer system is connected to the World Wide Web and capable of receiving web pages each having an associated URL, text words and at least one graphic image file. The computer system applies layers of filtering to a selected web page to evaluate such for the presence of objectionable content, including comparing the terms in the URL and the text words from the selected web page to a list of marker terms. Preferably, web pages having acceptable URLs, acceptable text words, and a number of text words greater than a predetermined number are allowed to be displayed regardless whether graphic image files are present. In this case the above evaluation steps are only performed on graphic image files from web pages that have acceptable URLs, acceptable text words, and a total number of text words less than the predetermined number. This allows the computer system to perform "on-the-fly" evaluation of web pages with minimal temporal impact on the user.

These and various other features and advantages of the present invention will be apparent from a reading of the following detailed description in conjunction with a review of the associated drawings.

DETAILED DESCRIPTION

The present invention is directed to a method and apparatus for evaluating computer graphic image files for objectionable content, and to disallow the displaying of such files on a computer monitor to prevent minors from viewing such content.

Figure 1:
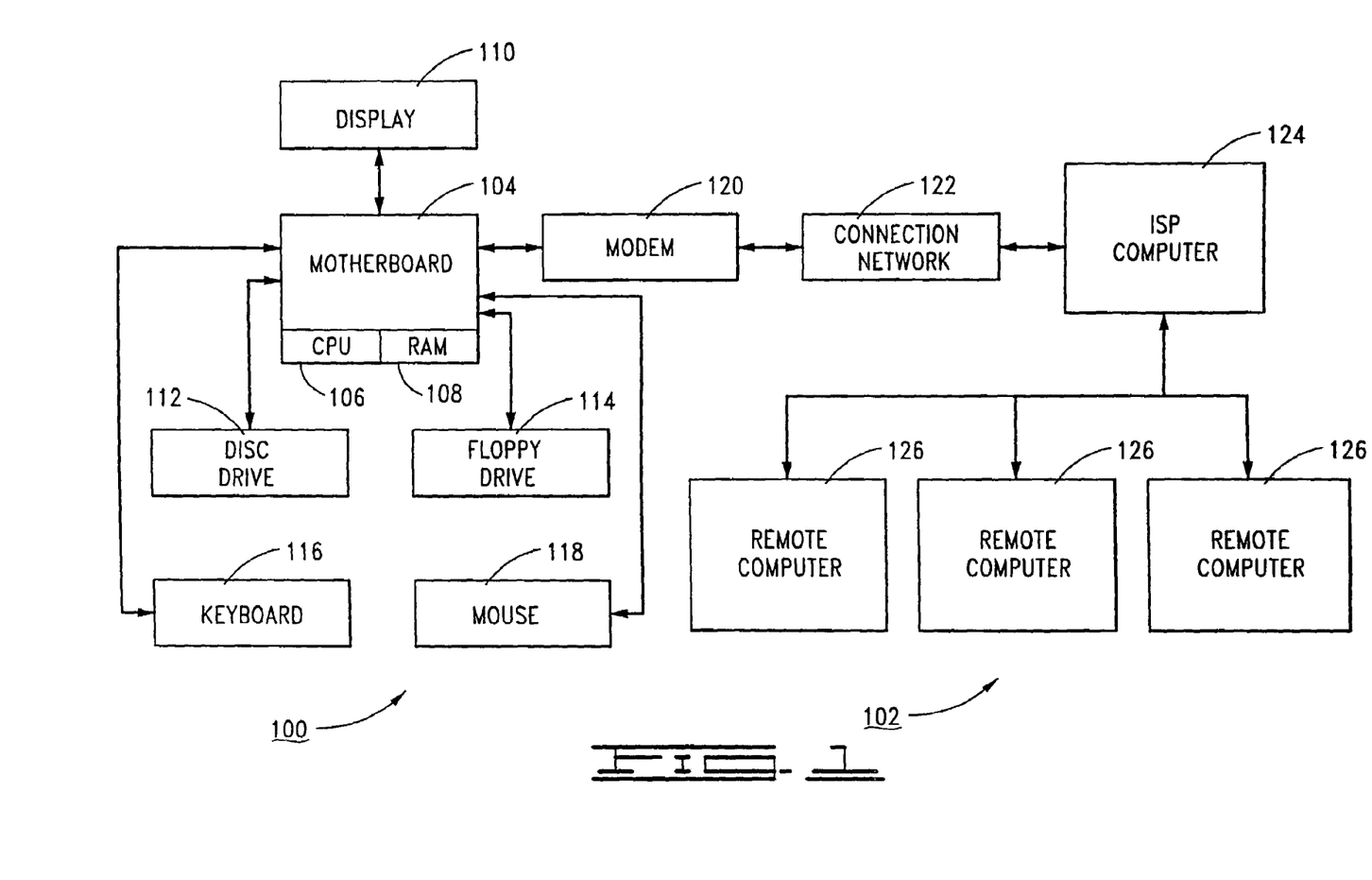
FIG. 1 is a functional block diagram of a computer system constructed and operated in accordance with preferred embodiments of the present invention.

In order to describe presently preferred embodiments of the present invention, reference is made first to FIG. 1, which shows a finctional block diagram of a computer system (personal computer, PC) 100 constructed and operated in accordance with preferred embodiments of the present invention. The PC 100 is shown connected to a remote computer network 102, and thus has the capability of accessing the Internet, including web pages from the World Wide Web. It will be understood that the PC 100 is a general purpose computer having associated programming to carry out steps in accordance with the methodology presented below to filter graphic image files and web pages for objectionable visual content.

The PC 100 includes a motherboard 104 which supports a central processing unit (CPU) 106 and associated memory in the form of random access memory (RAM) 108 (it will be understood that memory storage will not be limited to RAM but can extend to methods such as disk cache, flash memory, EEPROM, and others). The CPU 106 controls the execution of software programs (applications) by the PC and provides user viewable output to a display monitor 110. Long term storage of applications and files is provided by a hard disc drive 112 and a floppy drive 114, the latter of which enables the user to insert removable storage diskettes (not shown). User inputs are provided to the CPU 106 by a keyboard 116 and mouse 118.

The PC 100 further includes a modem 120 which enables the PC 100 to connect, via a connection network 122, to a computer 124 of an Internet Service Provider (ISP) to which the user subscribes. The ISP, in turn, connects the PC 100 to other computers 126 throughout the network. It will be noted that at this time many users access ISPs through telephone connection networks, although other connection technologies, such as coaxial cable and fiber optics, are also employed. Of course, the particular manner in which the PC 100 obtains Internet access is not germane to the present invention.

As discussed above, the user of the PC 100 can obtain a particular web page from a selected computer 126 by establishing a connection to the ISP computer 124, executing resident browser software (typically stored on the disc drive 112 and loaded into the RAM 108) and typing in the URL corresponding to the desired page in a URL field on the display 110. The ISP computer 124 will proceed to contact the selected computer 126 and request, via the aforementioned hypertext protocol, the selected page. The selected computer 126 will thereafter initiate the transfer of the information making up the selected page (in packets) to the RAM 108, and the CPU 106 will proceed to display the selected page on the display 110. The time required to display the selected page will vary depending upon several factors, including the size of the page, the ability of the selected computer 126 to service the request and the bandwidth of the connection network 122. Nevertheless, any selected page on the Internet is usually available in no more than a few seconds, increasing the probability that a minor user may be able to view objectionable content from a particular page.

Figure 2:
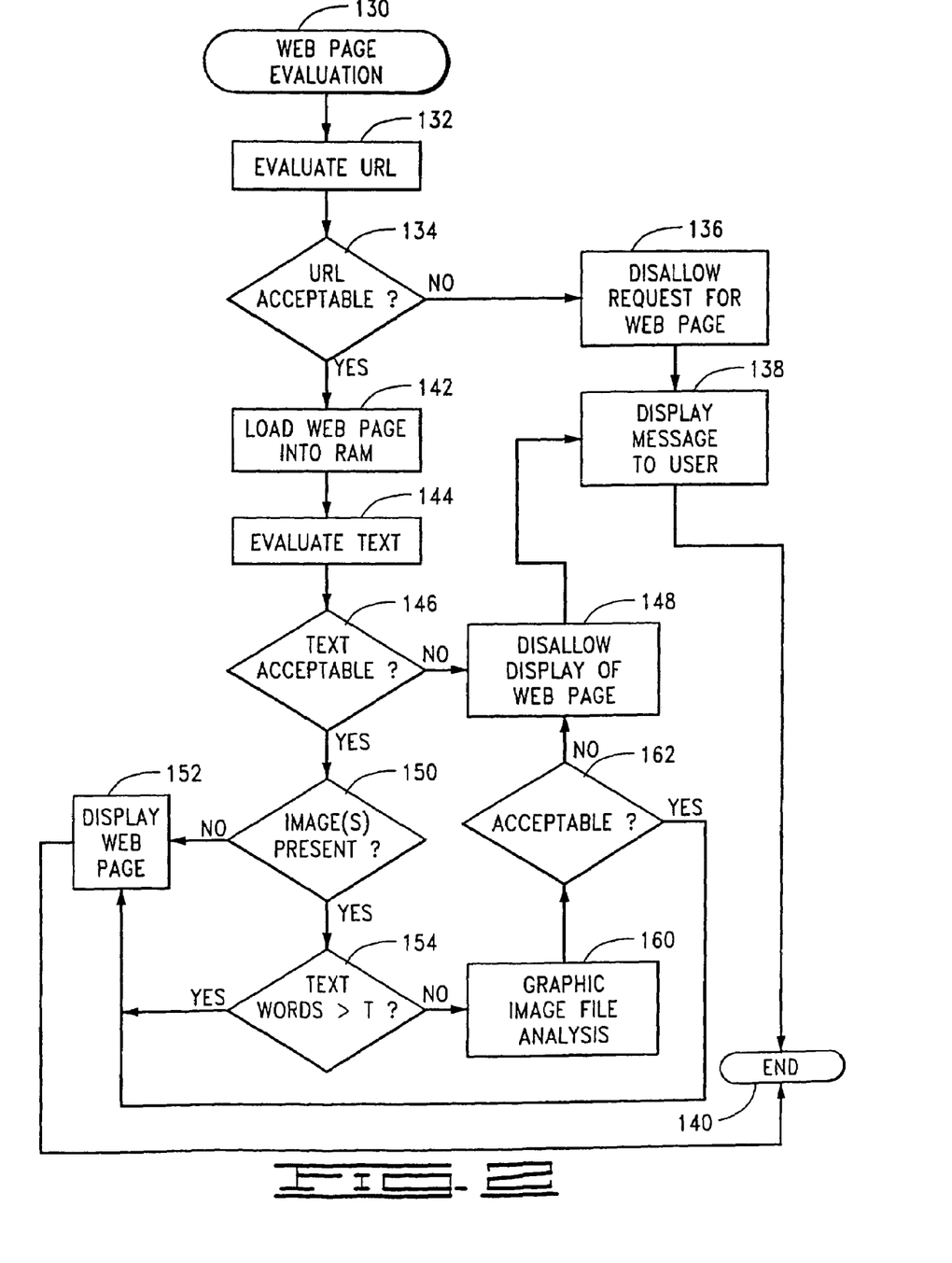
FIG. 2 is a flow chart for a WEB PAGE EVALUATION routine, generally illustrative of steps carried out by the computer system of FIG. 1 to evaluate web pages for objectionable visual content.

Accordingly, FIG. 2 provides a flow chart for a WEB PAGE EVALUATION routine 130, illustrative of steps carried out by software formatted and executed in accordance with the present invention. Preferably, the software is incorporated as part of the browser software utilized by the PC 100 to control the displaying of graphic image files to the display 110. The software is preferably written in C++ programming language and compiled into a form that is readily executable by the CPU 106. It will be noted that the evaluation steps performed by the routine are designed to be computationally efficient and occur on the fly so as to have a minimal temporal impact on the user.

When the user types in (or otherwise selects) a URL for a selected hypertext web page, the routine first checks the text of the URL for objectionable terms ("marker" terms), as shown by step 132. Preferably, the marker terms are previously selected and arranged into a list as a set of adult-oriented, explicit text words that are sometimes employed to describe the address of objectionable sites. Examples can include terms such as "sex" and "adultpics," since the use of these terms in the URL provides a high probability that the corresponding content of the page contains objectionable material. Of course, the marker terms list will preferably also include more explicit terms which are not suitable for replication here.

The marker terms list can further be configured to include the second level domain names or full URLs for sites previously found to contain objectionable material, thereby blocking access to the top level page and all subpages of such sites. Updated marker terms lists can be made available for download periodically from the software supplier or other sources, as desired.

Thus, the evaluation of step 132 involves a sequential comparison of the second level domain name and any subpage file names in the requested URL text against each of the marker terms in the marker terms list. The effectiveness of this step will be a function of the size and organization of the marker terms list; a more comprehensive list of terms will provide more thorough screening, but may add additional time to the operation.

The operation of step 132 can also be configured to restrict display of the results of a search engine query involving inappropriate terms. As will be recognized, there are currently several search engine sites available on the Internet that categorize and display a list of sites based on key words entered by the user in a query field on the search engine page. While the routine of FIG. 2 will not typically restrict a user from typing and submitting inappropriate words into the query field, many search engines automatically generate a unique URL for the search results that include the selected search terms; thus, the operation of step 132 can further be configured to evaluate such automatically generated URLs and restrict the display of the results from the query.

If the URL is found by step 132 to contain one or more of the marker terms, decision step 134 passes to step 136 wherein the routine disallows request and/or display of the selected page. An appropriate message informing the user that access to the selected page is denied is then displayed on the display 110 at step 138 and the routine ends at step 140.

On the other hand, should the URL be found acceptable, the routine passes from decision step 134 to step 142 wherein the browser software proceeds to request the selected web page from the remote computer 126 and load the page into RAM 108. It will be noted that the page, while residing in RAM 108, is not yet allowed to be displayed by the display 110.

The routine next operates at step 144 to evaluate the text of the loaded page for the presence of marker terms. Preferably, the same list of marker terms that was previously used at step 132 can also be used at step 144, although separate lists can also be maintained and tailored as desired. A count of the total number of text words in the loaded page is also preferably performed at this time.

As shown by decision step 146, if the text of the loaded page is found to be unacceptable, the routine passes to step 148 wherein the routine disallows display of the web page to the display 110. The routine then passes to step 138 to provide the user with a message to this end. Although not shown by the routine of FIG. 2, it is contemplated in one embodiment that the URL of the page can also be added at this time to the marker terms list used at step 132, so that future requests for this page are denied without the need to again physically load the page into RAM 108 and reperform the analysis of step 144.

When the text of the web page is found to be acceptable, however, the routine next inquires whether graphic image files (digital images) are included within the contents of the loaded page, as shown by decision step 150. Such graphics may be in the form of advertising banners, moving applets and/or thumbnailed images, and will typically have a *.jpg or *.gif filename extension. Although many web pages at present include at least some amount of graphics, some web pages are purely text. Hence, if no graphic images files are indicated within the source code for the page, the routine passes from decision step 150 to step 152 and the selected web page is displayed by the display 110. The routine then ends at step 140.

On the other hand, when at least one graphic image file is present, the routine continues from decision step 150 to decision step 154, which inquires whether the number of text words exceeds a threshold value T. The rationale for this step is based on the observation that pages with a sufficient amount of nonobjectionable text have a high probability of not displaying objectionable graphic image files. A suitable value for the threshold T might be 200 text words, although other values can be readily used as desired. When the number of text words N exceeds the threshold T, the routine passes to step 152 and the selected page is displayed on the display 110.

When the number of text words N does not exceed T, there remains a risk that the graphics files may be objectionable. For example, objectionable images can often be displayed on a subpage with very little (or no) text. In this case, the flow passes to a graphic image file analysis routine at step 160 to analyze the particular contents of the graphic image file. The manner in which this analysis takes place will be discussed below with reference to FIG. 3. At this point, however, it will be noted that if the file is found to be unacceptable, as shown by decision step 162, the routine passes to step 148 so that the page is not displayed; contrawise, if the file is found to be acceptable, the routine passes to step 152 and the page is displayed. In an alternative embodiment, the routine is configured so that the text contents of the page are displayed, but the graphic file or files within the page found to be unacceptable are not displayed. In such case, a message such as "Image not available" can be displayed on the page in the location where the non-displayed graphic image would have otherwise been displayed.

Figure 3:
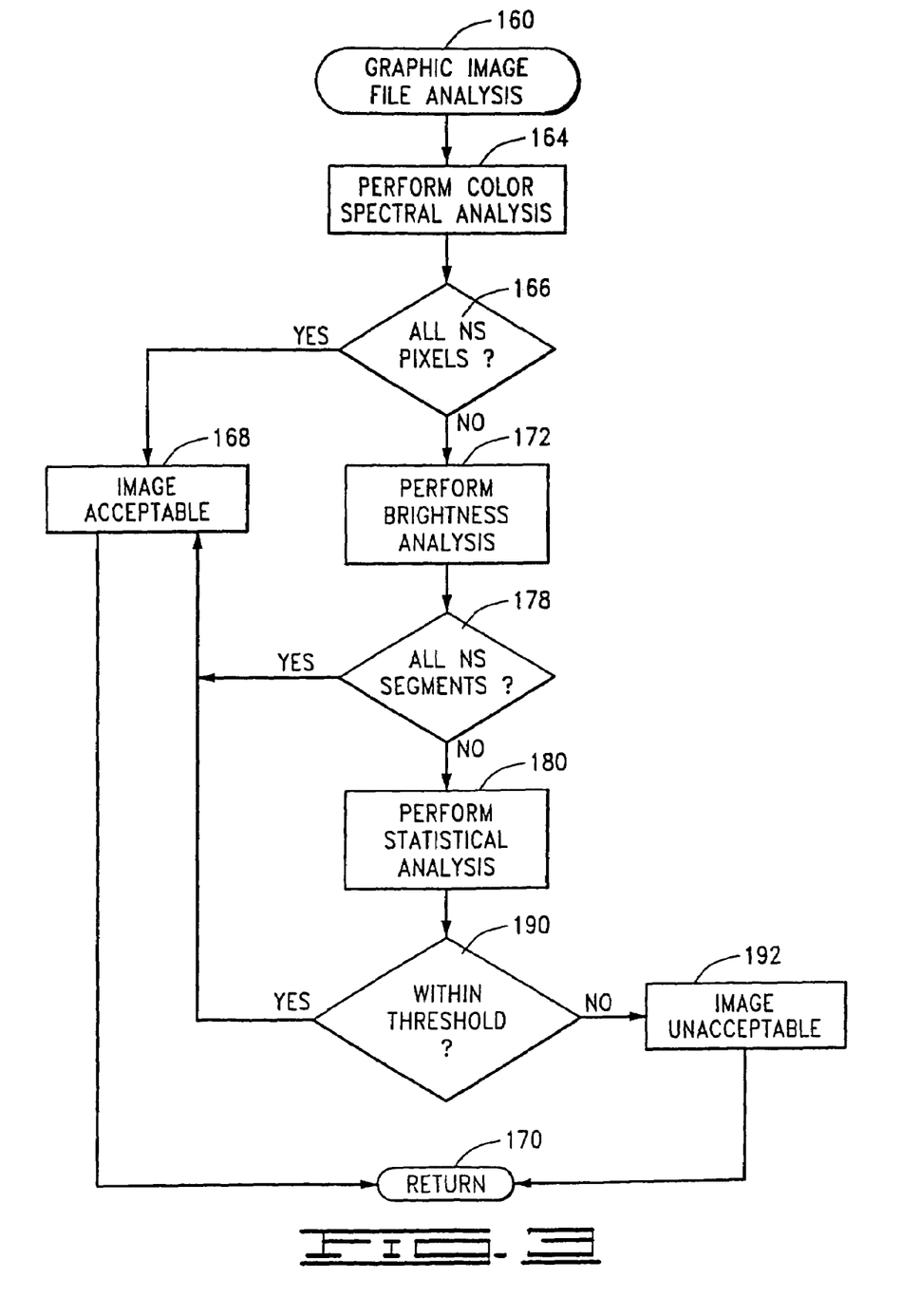
FIG. 3 is a flow chart for a GRAPHIC IMAGE FILE ANALYSIS routine, which can be a stand-alone routine or a subroutine of the routine of FIG. 2 to evaluate graphic image files for the presence of objectionable visual content.

Referring now to FIG. 3, shown therein is a flow chart for the aforementioned GRAPHIC IMAGE FILE ANALYSIS routine 160 of FIG. 2. In order to provide a detailed explanation of the operation of the routine of FIG. 3, it will be helpful to first briefly discuss the manner in which graphic image files are typically formed.

Graphic image files are arranged as an array of individual pixels which, when displayed together, make up the resulting image. The physical size of a graphic image on a display is a function of the number of rows m and columns n of pixels (m×n). Thus, a graphic image file might be expressed as a 640×480 image, meaning 640 rows of pixels with 480 pixels in each row. The resolution of a displayed image is a function of the display; displays that provide smaller pixel sizes typically provide better quality images.

Each individual pixel in a graphic image file can be expressed in relation to a color model that identifies spectral components as an ordered set of numbers. Preferred embodiments of the present invention use the so-called RGB color model, which expresses the spectral components of each pixel as a selected combination of individual amounts of three primary colors: red, green and blue. As will be recognized, cathode-ray tube (CRT) monitors typically utilize three cathode-ray guns, with each emitting a different one of these colors. Each spectral component can have 256 ($2^8$) values, usually expressed from 0 to 255. Hence, a set of spectral components (R, G, B) can be constructed for each pixel, and the individual values and relative weighting of the R, G, B components determine the particular color of the displayed pixel. For reference, some example (R, G, B) component sets and the resulting displayed pixel colors are set forth in Table 1 below.

TABLE 1

| (R, G, B) | Resulting Pixel Color |
|---|---|
| (0, 0, 0) | Black |
| (255, 255, 255) | White |
| (255, 0, 0) | Bright Red |
| (0, 255, 0) | Bright Green |
| (0, 0, 255) | Bright Blue |
| (255, 255, 0) | Bright Yellow |
| (255, 125, 0) | Orange |
| (54, 54, 180) | Deep Blue |
| (100, 155, 60) | Olive Green |
| (75, 75, 75) | Charcoal Grey |

A total of 16,777,216 (256×256×256) different colors can be obtained for display using this scheme. It will be noted that black and white (gray scale) images use pixels with equal red, green and blue values (i.e., R=G=B).

Returning to the flow of FIG. 3, a spectral analysis is first performed on the graphic image file at step 164 to evaluate relative weighting of the spectral components of each pixel in a set of pixels from the image file. Preferably, the set of pixels comprises all of the pixels in the image, but it will be understood that the following analysis can be performed on less than all of the pixels in the image file, as desired.

The spectral analysis preferably involves evaluation of the individual (R, G, B) spectral components for each pixel in turn on a row by row basis since this is the manner in which the pixels are typically stored in the RAM 108. Through empirical analysis, it has been determined that pixels in graphic images that are used to display the skin of a human body typically fall within fairly well defined spectral ranges. This has been found to be consistent irrespective of the particular race or skin pigmentation of the individual in the image, as well as irrespective of the relative brightness of the image.

The spectral analysis of step 164 involves the classifying of each pixel as either not likely representing human skin (also referred to as "non-skin," or "NS" pixels), or possibly representing human skin (also referred to as "possibly-skin," or "PS" pixels). The analysis preferably involves application of rules which are summarized in Table 2. It will be noted that the analysis proceeds to identify and set aside those portions of the image file that are not likely to represent human skin.

TABLE 2

| Rule: | Result: |
|---|---|
| 1. If B > R: | Not skin. |
| 2. If G < B: | Not skin. |
| 3. If G > R: | Not skin. |
| 4. If B < (1/4)R: | Not skin. |
| 5. If B > 200: | Not skin. |

The first rule states that if the blue component is greater than the red component, then the pixel most likely does not represent human skin. For example, a pixel with values (200, 154, 226) would be eliminated by this rule as not skin, since the blue component relative to the red component is too great. The second rule states that if the green component is less than the blue component, the pixel most likely does not represent human skin. Thus, for example a pixel with values (210, 134, 150) would be eliminated as not skin, as the green component is too low relative to the blue component.

The third rule states that if the green component is greater than the red component, the pixel most likely does not represent human skin; hence, a pixel with values (85, 90, 75) would be eliminated as not skin. The fourth rule states that if the blue component is less than one-fourth of the red component, the pixel most likely does not represent human skin. Thus, a pixel with values (104, 78, 15) would have insufficient blue as compared to red. The fifth rule states that if the absolute value of the blue component is greater than a threshold T (in this case T=200), the pixel most likely does not represent skin. Hence, a pixel with values of (255, 240, 210) would be eliminated by this rule as having simply too much blue to likely represent human skin.

Once each of the pixels has been evaluated as either an NS pixel or a PS pixel, the routine of FIG. 3 proceeds to decision step 166, which determines whether all of the pixels are NS pixels. If so, the image is identified as acceptable at step 168 and the routine returns at step 170. By way of illustration, an outdoor scene of dark green hills and a bright blue sky might have all NS pixels, in which case display of the image would be allowed.

However, if the image contains at least some PS pixels, display of the image is at least temporarily disallowed pending further analysis. As shown by FIG. 3, such analysis includes brightness analysis at step 172. During this step, each complete set of adjacent PS pixels (by row) is evaluated in turn to determine whether the pixels suggest a curved or shaded surface. For example, the torso of a human body is a three-dimensional figure, and an image of that torso will most likely be relatively brighter in mid-portions (most parallel to the camera) as compared to the sides (which will generally curve away from the camera). This can be compared to a skin-hued wall that is a two-dimensional figure and will not generally exhibit such characteristic curvature and shading.

Figure 4:
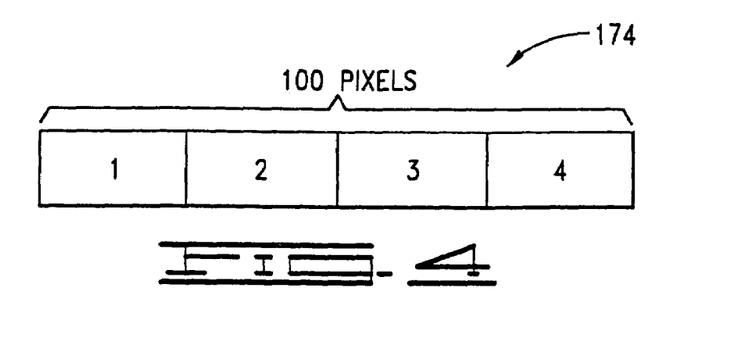
FIG. 4 is a representation of a set of adjacent pixels from a graphic image file.

FIG. 4 provides a schematic representation of a segment 174 comprising 100 adjacent PS pixels from a row of the selected image file under evaluation. During the brightness analysis of step 172 (FIG. 3), a brightness measurement is first calculated for each of the pixels in each set (segment) of pixels turn. This brightness measurement can be obtained in a variety of ways, such as by calculating a weighted sum of the R, G, and B values. However, for computational efficiency the brightness measurement is preferably obtained simply by summing the R, G and B values. Hence, a pixel with (200, 150, 100) color component values would have a resulting brightness value of 200+150+100=450.

The segment 174 is quartered, that is, divided into four equal portions of 25 pixels each (identified as portions 1, 2, 3 and 4 respectively). The brightness values for each of the pixels in each portion are then summed (these sums are respectively referred to as S1, S2, S3 and S4). A middle brightness sum M is calculated as the combination of the sums for the two middle portions 2 and 3 (i.e., M=S2+S3), and an end brightness sum E is calculated as the combination of the sums for the two end portions 1 and 4 (i.e., E=S1+S4). Finally, the value of M is compared to E. If M is greater than E, the segment 174 could possibly represent skin, whereas if E is greater than or equal to M, the segment is eliminated as being not skin.

Figure 5:
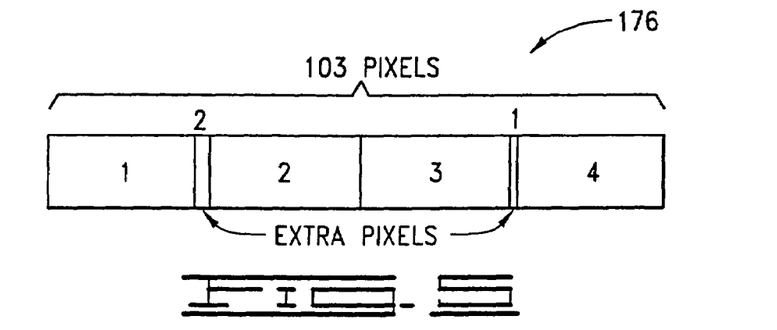
FIG. 5 is a representation of another set of adjacent pixels from a graphic image file.

It will be noted that in order to carry out the foregoing analysis, the segment of adjacent PS pixels must be at least four pixels in length. Accordingly, it will now be understood that the decision step 166 will also pass an image to acceptance (step 168) even if the image has some PS pixels as long as there are no more than three adjacent PS pixels anywhere in the image. Also, since the brightness analysis of step 172 divides each segment of adjacent PS pixels into four equal portions, the brightness analysis further includes a prior step of using integer math to divide the length of the segment by four. Remaining pixels are preferably located between adjacent portions and not included in the analysis. By way of illustration, FIG. 5 shows a segment 176 of adjacent PS pixels having a total count of 103 pixels; each portion 1-4 includes 25 pixels and the remaining, extra three pixels are preferably located as shown.

Continuing with the routine of FIG. 3, at the conclusion of the brightness analysis of step 172, decision step 178 inquires whether all of the segments of adjacent PS pixels were eliminated as not skin; if so, the image is deemed acceptable and the routine passes to step 168. For example, a graphic image file of a sandstone cliff or a beige wall would most likely be eliminated as not skin and therefore deemed to be acceptable. On the other hand, if at least some segments of adjacent PS pixels are found to possibly be skin (referred to as PS segments), the routine continues to step 180 for a statistical analysis of these segments.

Generally, the statistical analysis of step 180 examines the run lengths (i.e., number of adjacent pixels) of the PS segments not eliminated by the brightness analysis of step 172. During the operation of step 172, each PS segment having M>E is accumulated as a count corresponding to the run length (i.e., number of adjacent pixels) of the segment.

Figure 6:
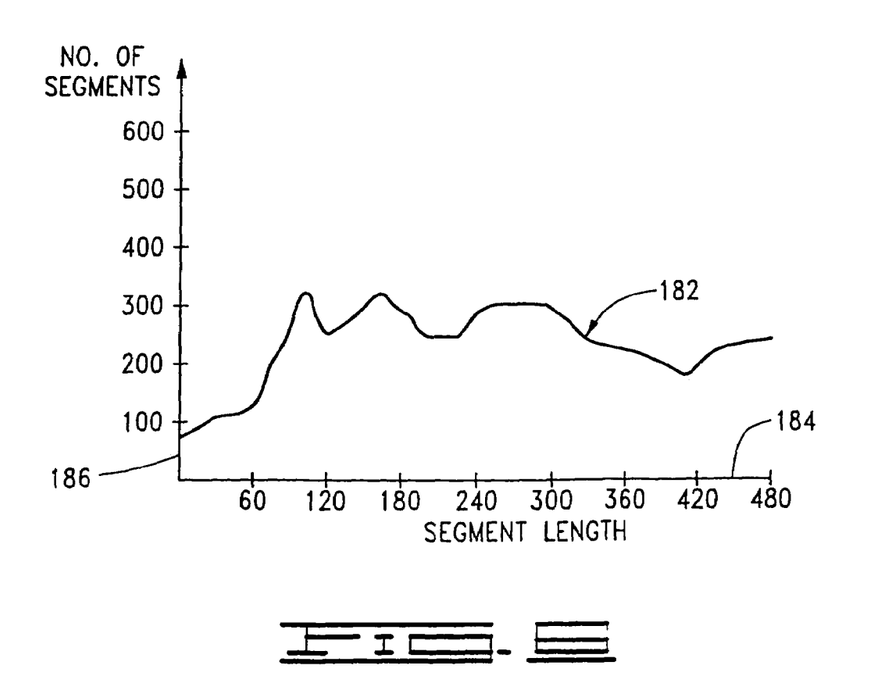
FIG. 6 is a graphical representation showing segment length versus number of segments for a graphic image file.

By way of example, FIG. 6 provides a graphical representation of a segment length curve 182 for a particular image file having a substantial number of PS segments. The curve 182 is plotted against an x-axis 184 indicative of segment length and a y-axis 186 indicative of total number of segments of each length. The image is contemplated as having a size of 640×480 pixels, so that PS segments that horizontally extend across the entire width of the image will have a total length of 480 pixels. From FIG. 6 it can be seen that the exemplary image file includes around 50 PS segments that are about four pixels in length, a little over 300 PS segments that are about 100 pixels in length, and about 200 PS segments that substantially extend the width of the image (480 pixels in length).

Once the run lengths for the PS segments have been accumulated, the analysis of step 180 proceeds to normalize the data by dividing the total width of the image by eight to form eight equal buckets and accumulating the total number of segments for each bucket. The data from the curve 182 of FIG. 6 have been generally represented in FIG. 7 in accordance with this normalizing step.

Figure 7:
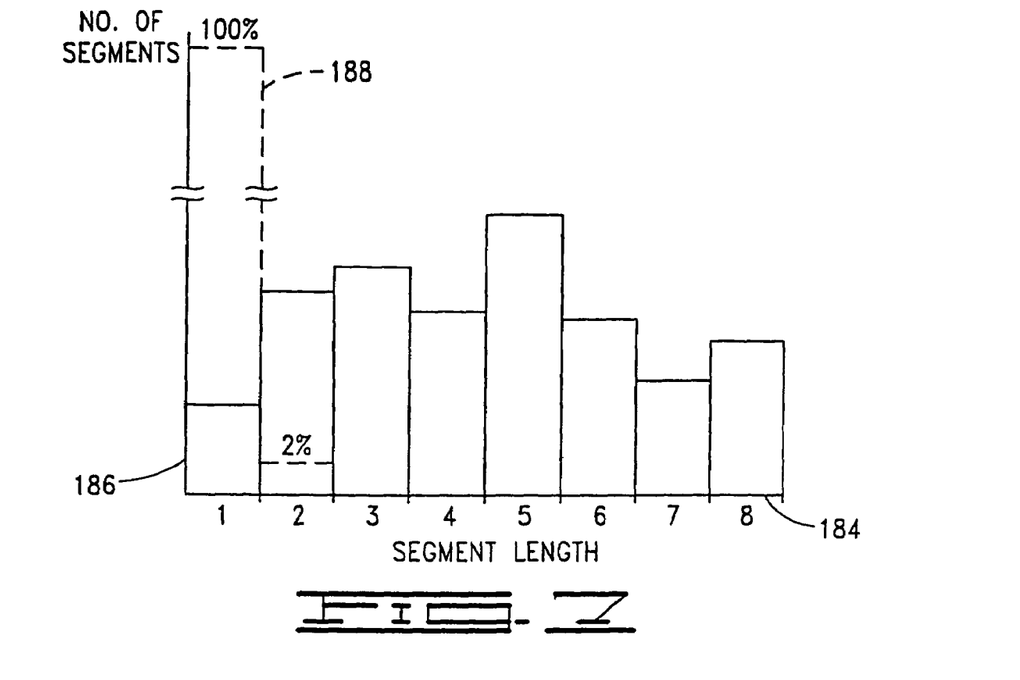
FIG. 7 is a graphical representation of a statistical analysis of run length for segments of adjacent pixels for a graphic image file.

A threshold test is applied to the normalized data. This threshold is indicated in FIG. 7 by dashed line 188, which allows up to 100% of the number of accumulated segments in bin 1, up to 2% of the number of accumulated segments in bin 1, and no segments in bins 3-8. If all of the PS segments are less than or equal to ⅛ of the width of the image, the image is acceptable. Alternatively, if up to 98% of the PS segments are less than or equal to ⅛ of the width of the image and up to 2% of the PS segments are between ⅛ and ¼ of the width of the image, then the image is also deemed to be acceptable. Otherwise, the image is deemed to be unacceptable.

Figure 8:
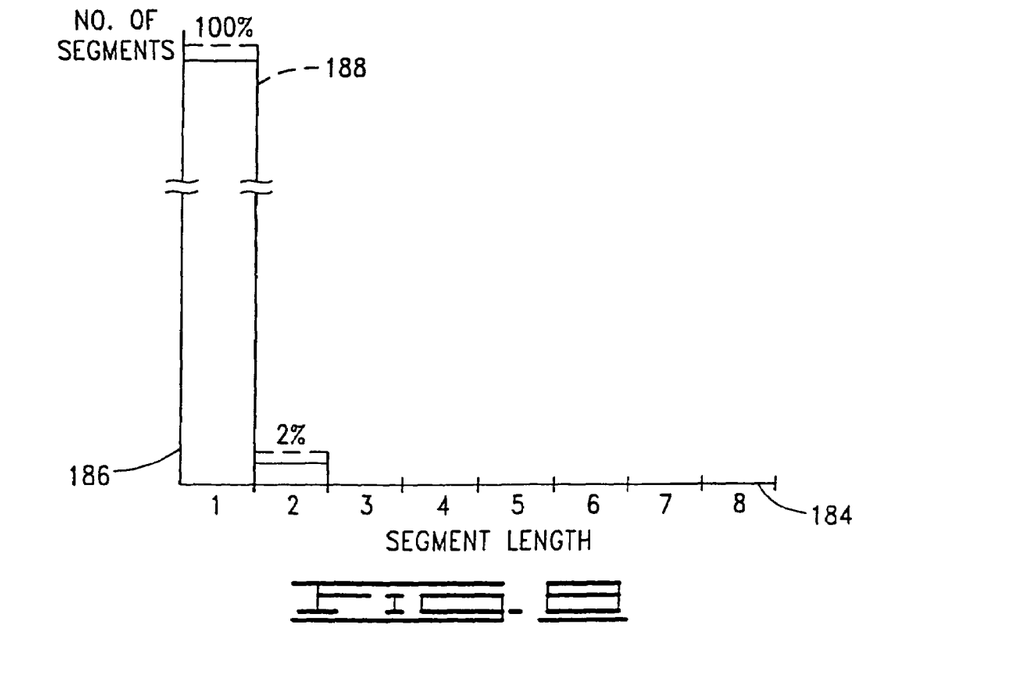
FIG. 8 is a graphical representation of a statistical analysis of run length for segments of adjacent pixels for another graphic image file.

Thus, the normalized data shown in FIG. 7 have segments outside these thresholds, and so access to the associated graphic image file would be denied. On the other hand, FIG. 8 represents normalized data for a different graphic image file, specifically a picture of a tree with leaves that have turned color in autumn. As can be seen from FIG. 8, such image falls within the thresholds and would be deemed acceptable for display. Decision step 190 illustrates this determination, with respective flows to acceptable step 168 and to unacceptable step 192.

In a further preferred embodiment, additional statistical analysis can be performed at step 180 to make an evaluation of web pages that have multiple graphic image files. This evaluation protects against a false rejection of a page with multiple images in cases where a minority of the images force a rejection. The percentage of rejected images and text available are weighed to decide whether the page should be displayed. For example, a page with w images (such as 20) and no objectionable text will still be displayed even if a subset v (such as 2) of those images trigger a rejection, as long as v is within a selected percentage of w. The basis for this additional analysis is predicated on the observation that there is a large probability that the subset of rejected images will not include objectionable content.

From the foregoing discussion it will be recognized that the present invention advantageously operates to restrict minors from viewing graphic image files with objectionable content. Efficient real-time operation is enhanced because the routine preferably only performs spectral analysis on a subset of the total number of requested pages; many pages will be initially blocked based on objectionable URL text, and other pages will be deemed acceptable based on the lengthy amount of non-objectionable text.

The routine of FIG. 3 preferably operates whenever the PC 100 attempts to open a graphic image file. A user bringing in a graphic image file from portable media, such as a floppy diskette or optical disc, will be prevented from viewing the image if the content is deemed unacceptable by the routine of FIG. 3.

The routine can be readily configured to also evaluate video files (which are stored as a series of individual image files, or frames) in, for example, Audio Visual Interleave (AVI) format. Such processing will typically take longer since multiple images must be evaluated. The use of sampling techniques to only evaluate a subset of the frames, such as every $15^{th}$ frame or every $30^{th}$ frame, can greatly reduce the processing time and still adequately evaluate the content of the video file. It will be noted that the routine can be adapted to evaluate both streaming video and video files resident on the local PC.

While the various preferred embodiments discussed above have used an RGB color model, other color models can readily be used as well, such as Hue, Saturation and Brightness (HSB) or Cyan, Magenta, Yellow and Key (CMYK). As will be recognized, HSB expresses the spectral components of each pixel in terms of hue (color), saturation (intensity) and brightness (how much baseline white or black is present). CMYK expresses the spectral components of each pixel in terms of the quantity of secondary colors (cyan, magenta and yellow) and key (black). For purposes of the claims, the phrase "color model" will be broadly understood to describe any scheme that represents colors as ordered sets of numbers and includes any number of possible color intensity and color space encoding schemes.

Moreover, while preferred embodiments presented herein have used a numeric value range of 0-255 for each of the RGB spectral components, it will be understood that any range of m to n values can be employed. Other exemplary ranges include, but are not limited to, 0-63 (VGA), 0-127 (high color), 0-1023 (sometimes used with flatbed scanners), 0-4095 (supported by JPEG and other standards) and 0-65,535 (used by certain types of computers).

It will now be clear that the present invention is well adapted to attain the ends and advantages mentioned as well as those inherent therein. While presently preferred embodiments of the invention have been described for purposes of the disclosure, it will be understood that numerous changes can be made which will readily suggest themselves to those skilled in the art. Such changes are encompassed within the spirit of the invention disclosed and as defined in the appended claims.

What is claimed is:

1. A computer based method for evaluating a graphic image file for the presence of objectionable visual content, the graphic image file comprising a number of pixels each having spectral components defined in accordance with a color model, the method comprising steps of:
   (a) evaluating relative weighting of the spectral components of each pixel in turn to classify each said pixel as either not representing human skin or as possibly representing human skin; and
   (b) processing the graphic image file in relation to the resulting classification of each said pixel during the evaluating step (a);
   wherein the color model comprises a numeric scheme so that the spectral components of each pixel are expressed as the equivalent of a set of red, green and blue (R, G, B) components corresponding to the respective amounts of red, green and blue in each pixel; and further wherein each of the (R, G, B equivalent) components has a numeric value ranging from m to n, and wherein the evaluating step (a) comprises a step of comparing the respective numeric values of the (R, G, B equivalent) components; and further wherein said pixel is classified as not representing human skin when at least one of the following conditions is satisfied:
   the numeric value of the R,G,B equivalent blue component is greater than the numeric value of the R,G,B equivalent red component;
   the numeric value of the R,G,B equivalent blue component is greater than the numeric value of the R,G,B equivalent green component;
   the numeric value of the R,G,B equivalent green component is greater than the numeric value of the R,G,B equivalent red component;
   the numeric value of the R,G,B equivalent blue component is less than one-quarter the numeric value of the R,G,B equivalent red component; and
   the numeric value of the R,G,B equivalent blue component exceeds a threshold T.

2. A computer system configured to evaluate a graphic image file for the presence of objectionable visual content, the graphic image file comprising a number of pixels each having spectral components defined in accordance with a color model, the computer system comprising:
   a general purpose computer having associated programming to:
   (a) evaluate relative weighting of the spectral components of each pixel in turn to classify each said pixel as either not representing human skin or as possibly representing human skin;
   (b) allow display of the graphic image file when all pixels are classified as not representing human skin; and
   (c) disallow display of the graphic image file when at least some pixels are classified as possibly representing human skin; wherein the color model comprises an RGB color model so that the spectral components of each pixel are expressed as a set of red, green and blue (R, G, B) components corresponding to the respective amounts of red, green and blue in each pixel; and further wherein said pixel is classified as not representing human skin when at least one of the following conditions is satisfied:

the numeric value of the blue component is greater than the numeric value of the red component;

the numeric value of the blue component is greater than the numeric value of the green component;

the numeric value of the green component is greater than the numeric value of the red component;

the numeric value of the green component is greater than the numeric value of the red component;

the numeric value of the blue component is less than one-quarter the numeric value of the red component; and the numeric value of the blue component exceeds a threshold T;

wherein the computer system is connected to a computer network and configured to receive web pages from the World Wide Web each having a URL address and each potentially having text words and at least one graphic image file, wherein the general purpose computer is further programmed to:

(d) compare a requested URL for a selected web page with a list of marker terms and disallow display of the selected web page when at least one term in the requested URL appears in the list of marker terms; and (e) compare the text words from the selected web page to the list of marker terms and disallow display of the selected web page when at least one of the text words appears in the list of marker terms.

3. A computer system configured to evaluate a graphic image file for the presence of objectionable visual content, the graphic image file comprising a number of pixels each having spectral components defined in accordance with a color model, the computer system comprising:

a general purpose computer having associated programming to:

(a) evaluate relative weighting of the spectral components of each pixel in turn to classify each said pixel as either not representing human skin or as possibly representing human skin;

(b) allow display of the graphic image file when all pixels are classified as not representing human skin; and (c) disallow display of the graphic image file when at least some pixels are classified as possibly representing human skin;

wherein the associated programming further configures the general purpose computer to perform a brightness analysis of each set of adjacent pixels classified as possibly representing human skin to determine whether each said set of adjacent pixels represents a curved surface, and allow display of the graphic image file when each said set of adjacent pixels is determined to not represent a curved surface; and further wherein the associated programming further configures the general purpose computer to perform a run length analysis by determining the number of pixels in each set of adjacent pixels classified as possibly representing human skin, and disallowing display of the graphic image file when at least one said set of adjacent pixels has a number of pixels that is greater than a selected percentage of the maximum number of possible adjacent pixels in a row of the graphic image file; and further wherein the computer system is connected to a computer network and configured to receive web pages from the World Wide Web each having a URL address and each potentially having text words and at least one graphic image file, wherein the general purpose computer is further programmed to:

(d) compare a requested URL for a selected web page with a list of marker terms and disallow display of the selected web page when at least one term in the requested URL appears in the list of marker terms; and (e) compare the text words from the selected web page to the list of marker terms and disallow display of the selected web page when at least one of the text words appears in the list of marker terms.

* * * * *